Figure 1:
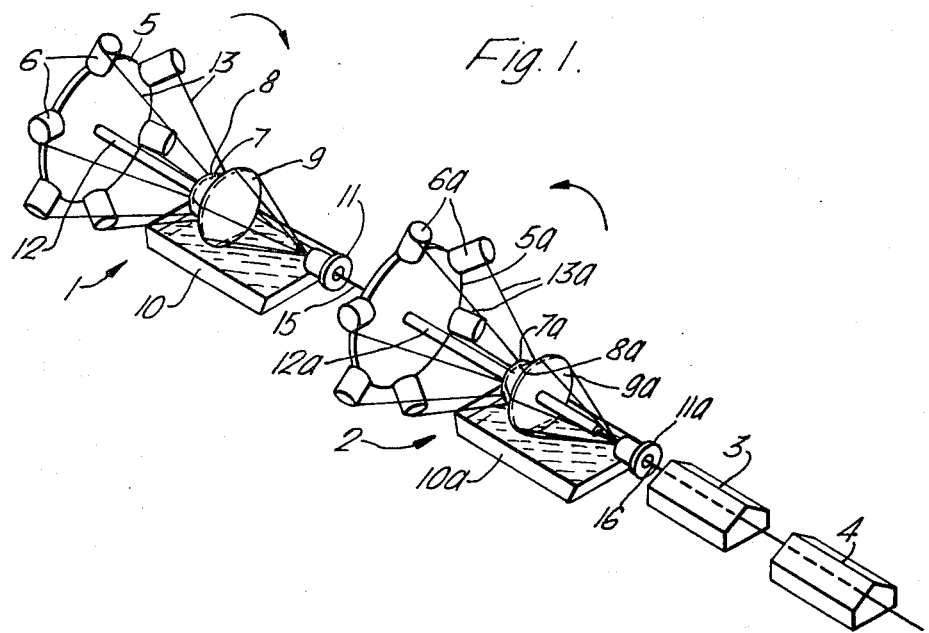

United States Patent [19] [11] 4,269,024
Ashpole et al. [45] May 26, 1981

[54] STRENGTH MEMBERS FOR THE REINFORCEMENT OF OPTICAL FIBRE CABLES

[75] Inventors: Raymond S. Ashpole, Leighton Buzzard; Colin J. Peachey, Bushey; Arup K. Kar, Teddington, all of England

[73] Assignee: Associated Electrical Industries Limited, London, England

[21] Appl. No.: 58,797

[22] Filed: Jul. 19, 1979

[30] Foreign Application Priority Data

Aug. 1, 1978 [GB] United Kingdom ............... 31797/78

[51] Int. Cl.³ .......................... D02G 3/36; D02G 3/44; D07B 7/14
[52] U.S. Cl. .......................................... 57/232; 57/7; 57/234; 57/250; 57/251; 57/292; 57/295; 57/902
[58] Field of Search ................. 57/210, 229, 232, 234, 57/243, 249, 250, 251, 258, 295, 296, 297, 7, 292, 902; 118/420, 423, DIG. 18–DIG. 22; 427/374.1, 118

[56] References Cited

U.S. PATENT DOCUMENTS

| 2,601,394 | 6/1952 | Hansen | 118/420 |
|---|---|---|---|
| 3,339,357 | 9/1967 | Merzocchi et al. | 57/296 |
| 3,885,380 | 5/1975 | Hacker | 427/118 X |
| 4,022,010 | 5/1977 | Gladenbeck et al. | 57/232 X |
| 4,095,404 | 6/1978 | Babayan | 57/297 |
| 4,159,618 | 7/1979 | Sokaris | 57/297 X |

FOREIGN PATENT DOCUMENTS

| 2655822 | 8/1977 | Fed. Rep. of Germany . |
| 2325062 | 4/1977 | France . |
| 1462159 | 1/1977 | United Kingdom . |
| 1483845 | 8/1977 | United Kingdom . |
| 1486227 | 9/1977 | United Kingdom . |
| 1486764 | 9/1977 | United Kingdom . |
| 1488528 | 10/1977 | United Kingdom . |

Primary Examiner—Donald Watkins
Attorney, Agent, or Firm—Kirschstein, Kirschstein, Ottinger & Cobrin

[57] ABSTRACT

A continuous elongate strength member for reinforcing an optical fibre cable consists of an assembly of aromatic polyamide filaments impregnated with a synthetic resin, in which the filaments are individually coated with the resin, and the filaments of at least an outer layer of the assembly are helically stranded. The impregnation is carried out by separating the filaments and immersing them in a low viscosity dispersion of the resin in a liquid medium; the filaments are then stranded, and the resin is cured. Apparatus for manufacturing the strength member and various forms of cable incorporating one or more strength members, are described.

9 Claims, 5 Drawing Figures

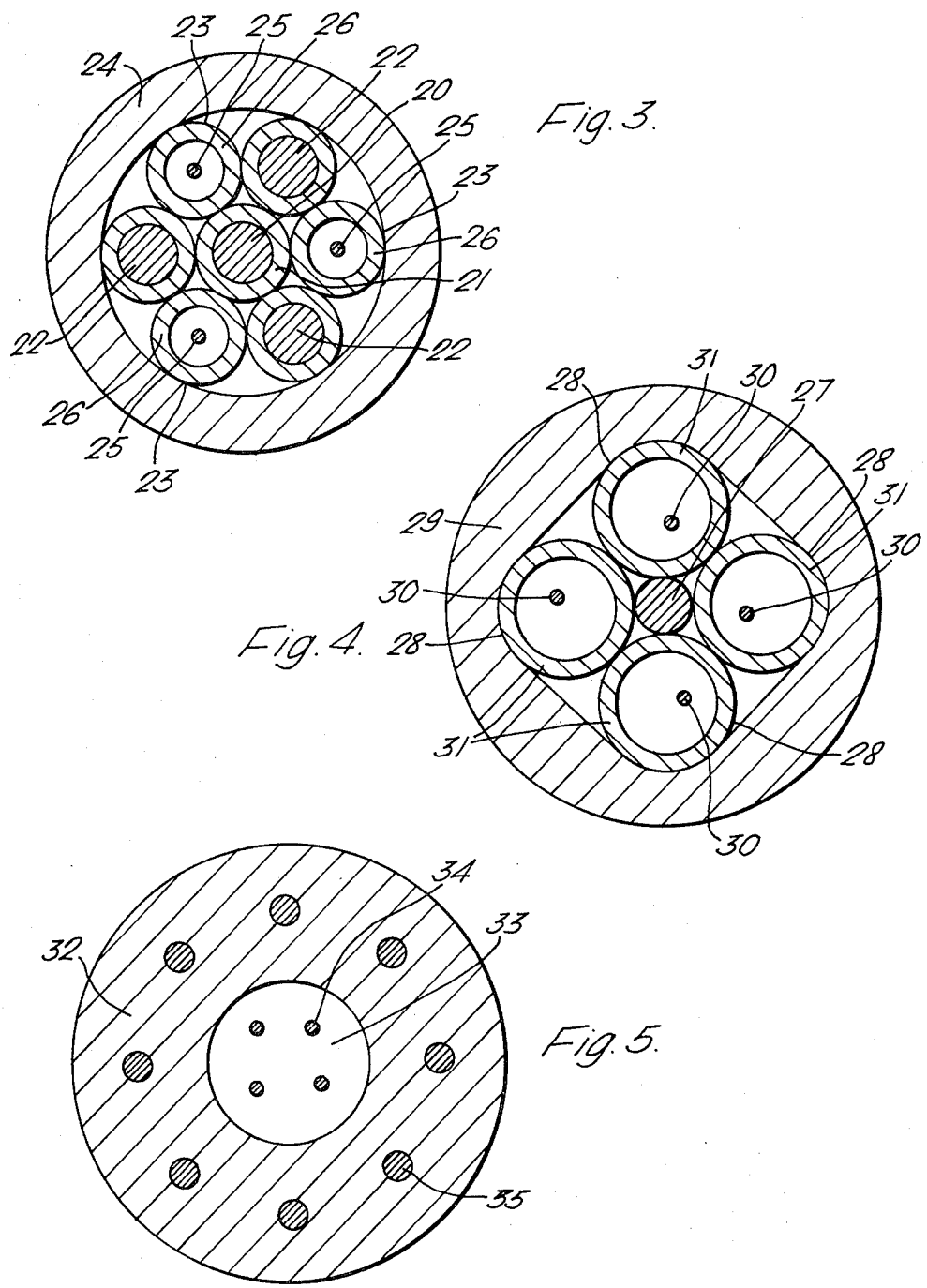

STRENGTH MEMBERS FOR THE REINFORCEMENT OF OPTICAL FIBRE CABLES

This invention relates to strength members for use in reinforcing optical fibre cables, that is to say cables of the type consisting essentially of one or more optical fibre waveguides disposed within an outer sheath of synthetic plastic material, the optical fibres possibly being surrounded, individually or in groups, by inner plastic sheaths. The invention also relates to a method of manufacturing the strength members described, and to optical fibre cables incorporating such strength members.

It has been proposed to provide optical fibre cables with elongate reinforcement members, either embedded in or disposed within the cable sheath, and extending continuously throughout the length of the cable, which members are formed of material having high tensile modulus and are of such cross-section that they do not appreciably reduce the flexibility of the cable. Such reinforcement members, hereinafter referred to as "continuous elongate strength members," are employed in order to increase the tensile modulus of the cable and to increase its resistance to buckling and crushing, thus protecting the optical fibres from mechanical stress during manipulation of the cable, and increasing the load bearing capability of the cable. It is also desirable that the strength members should be resistant to compression, in order to prevent longitudinal shrinkage of the cable sheath which would cause buckling of the optical fibres, with consequent increase in the attenuation losses occurring in the transmission of optical signals along the fibres. Steel wires form suitable reinforcement of this type, but in some cases the presence of electrically conducting strength members is undesirable, and strength members formed of non-conducting material are therefore required. Members composed of aromatic polyamide filaments have been proposed for use in such circumstances, but this material, while possessing the requisite high tensile modulus, is not resistant to compression.

It is an object of the present invention to provide improved non-conducting strength members which possess both high tensile modulus and high resistance to compression.

According to the invention, a continuous elongate strength member, as hereinbefore defined, for use in reinforcing an optical fibre cable is composed of an assembly of aromatic polyamide filaments impregnated with a synthetic resin, wherein the said filaments are individually coated with the resin and the filaments of at least an outer layer of the assembly are helically stranded.

The strength member so formed is a substantially rigid rod structure, and we have found that the combination of the intimate impregnation of the filament assembly with resin, achieved by the coating of the individual filaments, and the helical stranding of at least part of the assembly, imparts a high degree of compression resistance to the aromatic polyamide member. In addition, such complete impregnation prevents elongation of the strength member on the initial application of a load to a cable incorporating the strength member: in the case of an aromatic polyamide member which is unimpregnated, or incompletely impregnated with resin, some elongation usually occurs before the full load is taken up.

The filament assembly preferably consists of one or more yarns formed of aromatic polyamide fibre; the denier of the yarn and the number of yarns employed may be varied as desired according to the thickness of the strength member required. A suitable type of yarn is that sold under the trade name "Kevlar". Usually all the filaments of the assembly are helically stranded, the strength member composed either of a single bundle of filaments, for example formed of one or more yarns, individually coated with resin and stranded together, or of a first such bundle so stranded and one or more further bundles helically laid in a layer or layers around the first bundle, the successive bundles being stranded in opposite directions. Alternatively, a relatively thick strength member may be composed of a core of resin-coated straight filaments (that is to say, filaments which are not helically stranded), and one or more layers of resin-coated filaments helically stranded around the core.

The choice of impregnant resin, which is preferably of the thermosetting type, may depend to some extent on the temperature conditions to which the cable incorporating the strength member is to be subjected in use. Suitable resins include, for example, acrylic resins or a silicone varnish: a silicone-impregnated strength member is more flexible, and has less compressional strength, than a member impregnated with acrylic resin but the silicone has the advantage that it gives the strength member stability at higher temperatures, up to 200° C.

In a preferred method of manufacturing a strength member in accordance with the invention, the required intimate impregnation of the filament assembly is achieved by spreading out an initial assembly of filaments, for example a yarn or a plurality of yarns, so that the individual filaments are separated from one another, and immersing the separated filaments in a fluid consisting of a dispersion, in the form of a solution, suspension or emulsion, of the desired impregnant resin in a liquid medium, the fluid being of sufficiently low viscosity to ensure that the individual filaments are completely wetted thereby. The wetted filaments are then helically stranded, the excess fluid on the surface of the stranded impregnated assembly is removed, and the assembly is heated to a suitable temperature for evaporating the liquid medium and curing the resin.

The filament separation, wetting, stranding, and heating steps can readily be carried out consecutively as a continuous process. The separation and wetting of the filaments can be effected, for example, by passing the initial filament assembly across an edge of a rotating member, such as a disc, which is at least partially immersed in the resin-containing fluid, so that the filaments, spread out by passage over the said edge, are carried through the fluid by the rotating member. The filaments are then assembled together by passage through a die, or other suitable orifice, in which helical stranding is effected by the rotation of the said rotating member, and excess fluid is also removed from the stranded assembly by the die. The assembly is then passed through one or more curing ovens or other suitable heating means.

When the strength member includes two or more successively stranded bundles of filaments, the impregnation and stranding of the respective bundles can be carried out consecutively, and the whole assembly then passed through the heating means. If the strength member includes a core of non-stranded filaments, a straight bundle of filaments is fed continuously through the impregnating and stranding system so that one or more layers of wetted, stranded filaments are laid around it: the core bundle may, if desired, be previously impregnated with resin, but usually the excess fluid from the wetted filaments wound around it is sufficient to coat all the filaments of the core.

If desired, the resin-impregnated stranded, or partially stranded, filament assembly may be surrounded by a closely fitting sleeve of synthetic polymeric material. Thus a material having a high elastic modulus, such as amorphous nylon, may be extruded over the impregnated filament assembly, to increase the rigidity of the strength member. Alternatively, a relatively soft, low elastic modulus sleeve, for example formed of a wrapping of Melinex tape coated with a soft silicone resin ("Melinex" is Registered Trade Mark), may be applied to provide a cushioning layer for the strength member. Additional functions of such a sleeve are to increase the overall diameter of the strength member, which may be required to facilitate laying-up of a cable, and to promote adhesion between the strength member and the outer cable sheath, where the strength member is embedded in the sheath.

The strength members of the invention may be disposed in any desired location in an optical cable structure. Thus a single strength member may be located along the axis of the cable, and/or a plurality of strength members may be embedded in the cable sheath; alternatively, or in addition, a plurality of strength members may be disposed within the cable sheath, distributed among the optical fibres or surrounding one or more optical fibres forming the cable core. The optical fibres are preferably contained within individual inner sheaths, which may be either loose or closely fitting around the fibres. Where there is, within the outer cable sheath, an assembly of strength members, or of strength members and a plurality of optical fibre units each consisting of one or more optical fibres in an inner sheath, such assembly is preferably helically stranded, suitably around a strength member disposed along the cable axis. If desired, one or more strength members in accordance with the invention may be embedded in the wall of each inner sheath surrounding an individual optical fibre or group of fibres. In some cases one or more electrical conductors may be included within the cable sheath.

Figure 2:
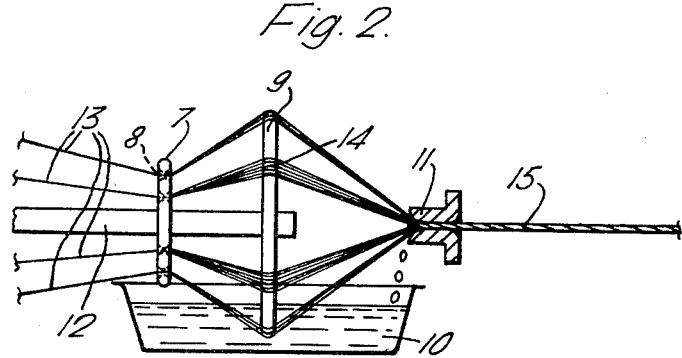

A specific method of manufacturing a strength member in accordance with the invention, and some specific forms of optical fibre cable incorporating one or more of the strength members of the invention, will now be described by way of example with reference to the accompanying diagrammatic drawings, in which FIG. 1 is a perspective view of the apparatus employed for carrying out the impregnating, stranding and curing steps in the manufacture of one form of strength member, FIG. 2 is an enlarged elevational view of a part of FIG. 1, and FIGS. 3, 4 and 5 respectively are cross-sections of three different forms of optical fibre cable including strength members in accordance with the invention.

The strength member produced by the method of the example is composed of Kevlar yarns impregnated with an acrylic resin, and consists of a helically stranded core of six 1420 denier "Kevlar 49" yarns overlaid by a further helically stranded bundle of six similar yarns. A suitable impregnant fluid is an aqueous emulsion of acrylic resin TR-407, manufactured by Rohm and Haas, the viscosity of the emulsion being less than 50 centipoises.

The apparatus shown in FIG. 1 consists of two sets of equipment, 1, 2, for carrying out the yarn impregnating and stranding procedures in two stages, and two curing ovens 3, 4. Each of the sets of equipment 1, 2 consists of a bobbin carrier 5, 5a, on which six bobbins 6, 6a, each wound with a single Kevlar yarn, are mounted, a yarn guide plate 7, 7a having six holes 8, 8a near its edge, a yarn spreader plate 9, 9a, a resin emulsion bath 10, 10a, and a closing die 11, 11a. The bobbin carrier, guide plate and spreader plate are all mounted on a shaft 12, 12a, for rotation, the shaft 12a being hollow, and separate electric motors (not shown) are provided for driving the two shafts independently of one another, in opposite directions as shown by the curved arrows in FIG. 1. FIG. 2 shows one assembly of guide plate 7, spreader plate 9, resin bath 10, and die 11. The spreader plate may be of metal, for example brass or stainless steel, or of polytetrafluoroethylene, and the guide plate and die are suitably of polytetrafluoroethylene.

In operation of the apparatus, six Kevlar yarns 13 are fed continuously from the bobbins 6 of set 1, through the respective holes in the guide plate 7, over the edge of the spreader plate 9, and through the die 11, while the system comprising the bobbin carrier, guide plate and spreader plate is rotated at a suitable speed compatible with the rate of travel of the yarns, for ensuring that the whole lengths of all the yarns are immersed in the resin bath as the spreader plate rotates. For example, the rate of linear travel of the yarns may be from 1 to 10 meters per minute, and the corresponding speeds of rotation of the system from 20 to 200 revolutions per minute. The yarns are maintained under slight tension, suitably produced by spring loading the bobbins. As the yarns pass over the edge of the spreader plate they are spread out, as shown at 14 in FIG. 2, and as the spreader plate rotates the separated filaments of each yarn in turn are immersed in the resin emulsion bath 10, so that the filaments are individually wetted by the emulsion. The impregnated yarns continue to travel to the die 11, in which they are closed together and are helically intertwisted as a result of the rotational motion imparted to them by the rotating system. Excess emulsion is wiped off the surface of the yarn assembly as it passes through the die, and drips into the bath from the entry end of the die.

The helically stranded, impregnated core 15, formed as described above, emerges from the die 11 and passes through the shaft 12a and die 11a; at the same time the yarns 13a are fed from the bobbins 6a, again under tension, through the holes in the guide plate 7a and over the edge of the spreader plate 9a, so that they are spread out and immersed in the resin emulsion in bath 10a, in the same manner as the yarns 13, and thence into the die 11a, where the impregnated yarns 13a are helically stranded around the core 15 and excess emulsion is wiped off. The spacing between each spreader plate and its associated die, and the rate of rotation of the plate and rate of travel of the yarns, are adjusted to give a desired pitch of the helix formed by the yarns: a suitable pitch is, for example, 4 cm for both the core and the overlay.

The completed impregnated yarn assembly 16 then passes through the ovens 3 and 4, which are respectively maintained at temperatures of 150° C. and 250° C., for driving off the residual water and curing the resin. The resulting product, which is substantially rigid and is 1.7 mm in diameter, may be wound on to a spool, or may be fed directly to means for applying a tightly fitting sleeve, for example an extruded tube of amorphous nylon of wall thickness 0.3 mm.

It will be understood that the apparatus shown in FIG. 1 may be reduced to a single set of equipment consisting of bobbins, guide plate, spreader plate, resin bath and die, together with the requisite curing ovens, or may be extended to include any number of such sets, for forming any desired number of layers of helically stranded resin-impregnated yarns. In addition, if desired, the number of curing ovens employed may be increased, as may be necessary for curing thicker yarn assemblies.

The cable shown in FIG. 3 of the drawings consists of a central strength member 20 of the form produced by the method described in the above example, in an extruded amorphous nylon sleeve 21, surrounded by a helically stranded assembly of three similar sleeved strength members 22 alternating with three optical fibre units 23, the pitch of the helix being 20 cm, and the whole assembly of strength members and optical fibre units being surrounded by an extruded outer sheath 24 of polyethylene 1.0 mm thick. Each of the optical fibre units 23 consists of a single optical fibre 25, for example a silica-based fibre of diameter 120 microns with a protective coating of polyurethane resin 15 microns thick, loosely disposed in an amorphous nylon tube 26 of the same external diameter and wall thickness as the nylon sleeves surrounding the strength members.

The cable shown in FIG. 4 consists of an axially disposed strength member 27, four optical fibre units 28 helically stranded around the strength member with a pitch of 15 cm, and an extruded polyethylene outer sheath 29 of 8 mm external diameter. The strength member 27 is composed of six 1420 denier Kevlar 49 yarns, impregnated with acrylic resin and helically stranded by the method described above with reference to FIGS. 1 and 2, using a single set of impregnating and stranding equipment, the diameter of the strength member being 1.0 mm. The optical fibre units 28 each consist of a fibre 30, of the type described with reference to FIG. 3, loosely disposed in an amorphous nylon tube 31 of external diameter 2.5 mm.

If desired, the cable structure shown in FIG. 4 may be modified by the insertion of additional strength members, of the same form as the member 27, in the four spaces between the optical fibre units 28. This arrangement, in addition to providing extra reinforcement for the cable, improves the circularity of the cable sheath.

The cable shown in FIG. 5 consists of an extruded polyethylene sheath 32 of outer diameter 8 mm, with a 3 mm diameter bore 33 in which four optical fibres 34, of the type described with reference to FIG. 3, are loosely disposed, and with eight strength members 35 embedded substantially in the centre of the sheath wall and equally spaced apart. The strength members are each composed of three 1420 denier Kevlar 49 yarns, impregnated with acrylic resin and helically stranded by the method described with reference to FIGS. 1 and 2, only one of the said sets of equipment being used in this case.

We claim:

1. A continuous elongate strength member for use in reinforcing an optical fibre cable, which is composed of an assembly of aromatic polyamide filaments impregnated with a synthetic resin, wherein all the said filaments forming the said assembly are individually coated with the resin, wherein the said assembly consists of a first bundle of said resin-coated filaments constituting the core of the assembly, and at least one further bundle of said resin-coated filaments helically stranded in at least one layer around said core, and wherein successive helical layers are stranded in opposite directions.

2. A strength member according to claim 1, wherein each said bundle of filaments consists of at least one aromatic polyamide yarn.

3. A strength member according to claim 1 wherein the said resin is a member of the group consisting of acrylic resins and silicone varnish.

4. A strength member according to claim 1 wherein the said first bundle of resin-coated filaments constituting the core of the said assembly is helically stranded in a direction opposite to that of the layer of resin-coated filaments laid directly upon the said core.

5. A strength member according to claim 1 wherein the resin-coated filaments of the said first bundle constituting the core of the said assembly are laid straight.

6. A strength member according to claim 1, wherein the said resin-impregnated filament assembly is surrounded by a closely fitting sleeve of synthetic polymeric material.

7. A method of manufacturing a strength member according to claim 1, which for the production of each helically stranded bundle of resin-coated filaments includes the steps of spreading out an initial assembly of aromatic polyamide filaments so that the individual filaments are separated from one another, immersing the assembly of separated filaments in a fluid consisting of a dispersion of the desired impregnant resin in a liquid medium, the fluid being of sufficiently low viscosity to ensure that the individual filaments are completely wetted thereby, helically stranding the wetted filaments, removing excess fluid from the surface of the stranded impregnated filament assembly, and heating the said assembly to evaporate the liquid medium and cure the resin.

8. A method according to claim 7, wherein the said steps are carried out consecutively as a continuous process wherein, the separation and wetting of the filaments are carried out by passing the initial filament assembly across an edge of a rotating member which is at least partially immersed in the said fluid, the filaments being spread out by passage over said edge and carried through the fluid by the rotating member, and wherein the filaments are then passed through an orifice, in which they are assembled together and are helically stranded by the rotation of said rotating member, and by which excess fluid is removed from the stranded assembly.

9. A method according to claim 8 wherein, for the manufacture of a strength member which includes at least two successively stranded bundles of filaments, the steps of separating, wetting and stranding the respective bundles are carried out consecutively, and the whole assembly is then passed through heating means for evaporating the liquid medium and curing the resin.

* * * * *